Figures 1, 2:
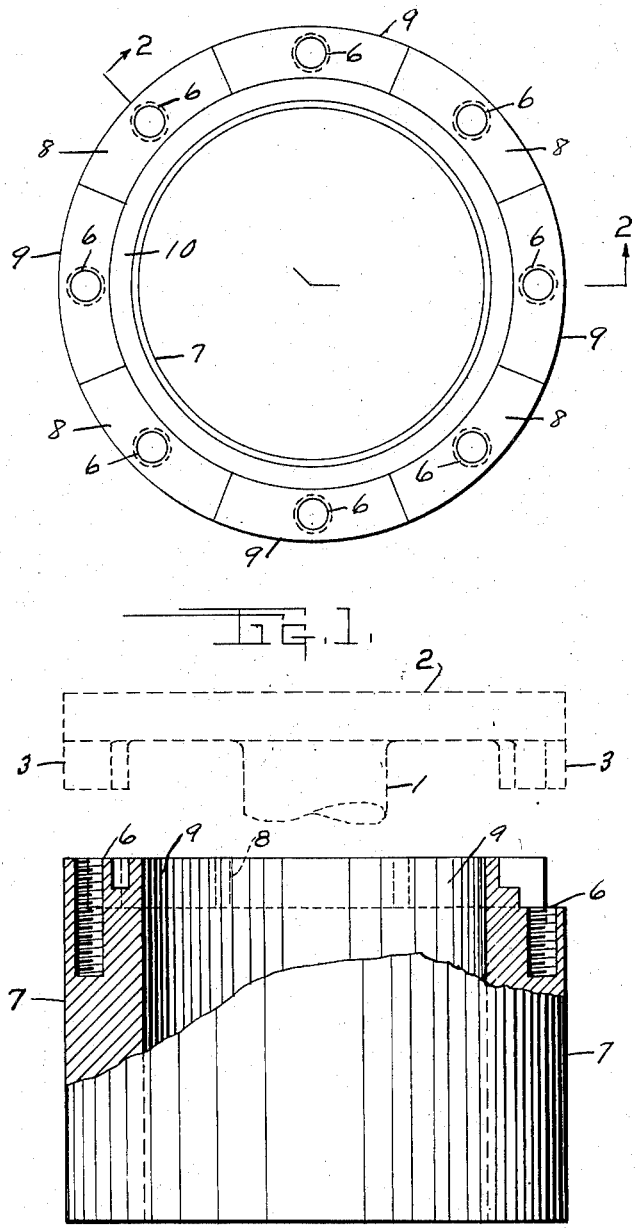

Venson F. McNair
and Calvin W. Wilson
INVENTORS

BY Chas. Denegre
Attorney

Aug. 7, 1951 V. F. McNAIR ET AL 2,563,409
SLOT TYPE HUB AND AXLE CONNECTION
Filed Sept. 4, 1948 2 Sheets-Sheet 2
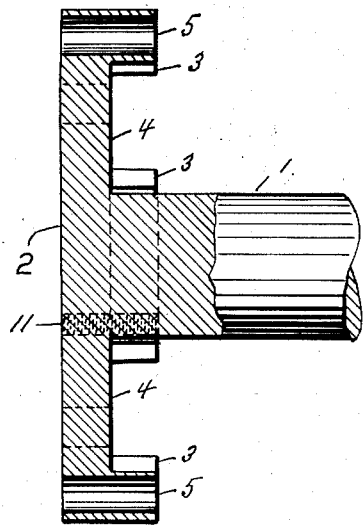
Fig. 3.
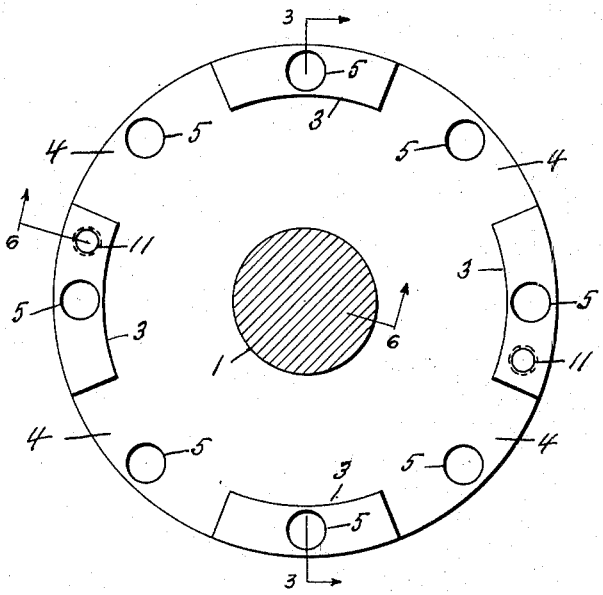
Fig. 4.
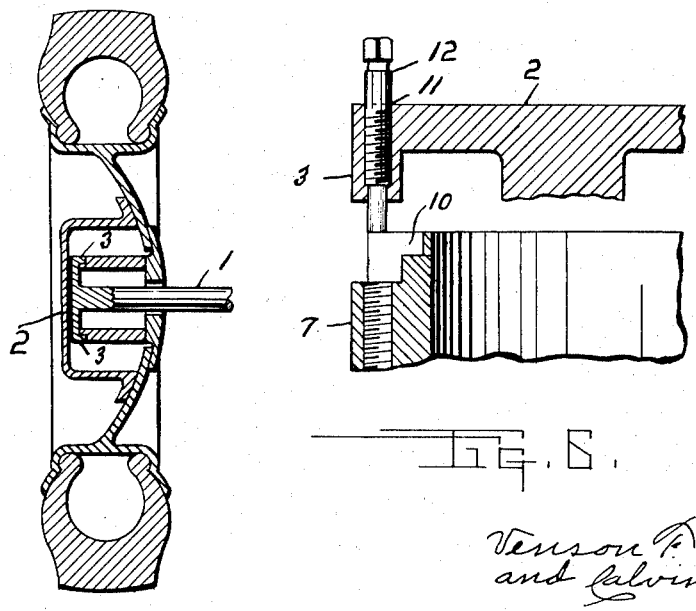
Fig. 5.
Fig. 6.
Venson F. McNair
and Calvin W. Wilson
INVENTORS
BY Chas. Senegre
Attorney.

Patented Aug. 7, 1951

2,563,409

UNITED STATES PATENT OFFICE 2,563,409

SLOT TYPE HUB AND AXLE CONNECTION

Venson F. McNair, Oxford, and Calvin W. Wilson, Birmingham, Ala.

Application September 4, 1948, Serial No. 47,852

2 Claims. (Cl. 301—1)

This invention relates to a slot type hub and axle connection. It has for its main objects to provide such a connection that will be highly efficient for its purpose, simple in structure, and extremely durable.

The type of such connection now in general use on motor driven trucks and the like consists of a disk integral with hub end of the driving axle that is provided with bolts that are inserted through plain holes in the disk and into threaded holes in the wall of the hub with a plain flat gasket between the disk and the edge of the hub wall. This structure is very unsatisfactory. It results in the bolts being sheared off or becoming loose as they carry the strain, and also allowing oil and grease to leak out of the bearings in the hub causing considerable extra expense. This trouble is more pronounced in heavy duty vehicles. With the present type of axle and hub connection all the pulling power or torque is off the stud bolts that hold the integral cap of the axle in place on the hub end with the companion slots and lugs interlocked with each other. The bolts hold the parts in proper relation to each other and also clamp a ring type gasket into a groove around in the wall of the hub, thus providing a perfect leak proof oil and grease joint.

Other objects and advantages will appear from the drawings and description.

By referring generally to the drawings, part of this application, it will be observed that Fig. 1 is a view of the end of a hub showing the slots and lugs and bolt holes; Fig. 2 is a side view on line 2—2 of Fig. 1 partly cut away and with the axle cap end in broken lines; Fig. 3 is a view on line 3—3 of Fig. 4 part full and part in section; Fig. 4 is a view of Fig. 3 assuming it to be all full and looking toward the axle end; Fig. 5 is a sectional view of a hub and tire assembly showing where the axle with its integral driving cap fit on the hub; and Fig. 6 is a detail fragmentary view on line 6—6 of Fig. 4, also showing the type of bolt used for prying and pulling the axle with cap out of the hub.

Similar reference numerals refer to similar parts throughout the several views.

Referring to the drawings in detail it will be seen that the device comprises a driving axle 1 with an integral cap-type end 2 having lugs 3 with slots 4 between the lugs. Plain holes 5 through the cap are for standard cap bolts to be inserted therethrough and screwed into the threaded holes 6 in the end of the hub 7 and clamp the cap tightly upon the hub end with the lugs 3 of the cap in the slots 8 of the hub and the lugs 9 of the hub in the slots 4 of the cap. In order to prevent oil from leaking from the joint between the cap and the hub end, a groove 10 is provided around in the wall of the hub in which a suitable ring-shaped gasket is placed and clamped in compressed condition when the assembly is in shape for use. Holes 11 in the cap are provided with threads in order for two bolts like 12 to be inserted and screwed to force the cap off of the hub should such be necessary.

The parts may be made of any material suitable for the purpose, but we prefer to use steel. Also the parts may be made in different sizes and capacities for various sizes of trucks and similar vehicles.

While we have shown and described the preferred embodiment of our invention, we do not wish to limit same to the exact and precise details of structure, but reserve the right to make all modifications and changes so long as they remain within the spirit and scope of the invention and the following claims.

Having described our invention we claim:

1. An axle and hub connection comprising; a round metal bar as an axle, a disk integral with one end of the axle, the outer edge portion of the face of the disk toward the axle having a plurality of integral elongated lugs spaced apart, each space between the lugs being substantially equal in length to the length of a lug, the outer edge portion of the disk having a plurality of holes therethrough, said holes being spaced apart with a hole through each lug and a hole through each space between the lugs, two threaded holes in the disk and positioned opposite each other, said threaded holes adapted for bolts to be screwed therethrough; a wheel hub, the edge of the hub having lugs and slots therein of sizes for the lugs of the disk to fit in the spaces in the hub and the lugs on the hub to fit in the spaces of the disk simultaneously; a groove extending around the edge of the hub, said groove adapted for a ring-type gasket to fit and be compressed therein between the disk and the hub.

2. An axle and hub connection for use in a truck wheel comprising; a round metal bar forming an axle, a round cap portion integral with one end of the axle, the outer edge portion of the face of the cap toward the axle having a plurality of integral lugs spaced apart, each space between the lugs being approximately equal in length to the length of a lug, the outer edge portion of the cap having a plurality of plain holes therethrough, said holes being spaced apart with a hole through each lug and a hole through each space between the lugs, said holes being adapted for cap bolts to be inserted therethrough; two threaded holes in the cap and positioned opposite each other, said threaded holes adapted for bolts to be screwed therethrough; a round cylinder-type hub, the edge of the hub having lugs and slots therein of sizes to register with the lugs and slots of the cap when placed adjacent each other, threaded holes in the edge of the hub, said holes adapted for cap bolts to be screwed therein; a groove extending around the edge of the cylinder hub, said groove adapted for a ring-type gasket to fit therein in tight condition and be compressed between the cap and the edge of the cylinder hub.

VENSON F. McNAIR.
CALVIN W. WILSON.

REFERENCES CITED

The following references are of record in the file of this patent:

UNITED STATES PATENTS

| Number | Name | Date |
|---|---|---|
| 863,604 | Herzog | Aug. 20, 1907 |
| 1,001,697 | Sharp | Aug. 29, 1911 |
| 1,272,565 | Sullivan | July 16, 1918 |
| 2,239,674 | Fredrickson | Apr. 29, 1941 |
| 2,417,467 | Bryant | Mar. 18, 1947 |
| 2,439,012 | Ledford | Apr. 6, 1948 |